United States Patent
Herrington et al.

(10) Patent No.: US 10,942,326 B2
(45) Date of Patent: Mar. 9, 2021

(54) CABLE STORAGE WHEELS

(71) Applicant: HUBBELL INCORPORATED, Shelton, CT (US)

(72) Inventors: Emily Hope Herrington, Birmingham, AL (US); Joshua Charles Wilson, Moody, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/253,513

(22) Filed: Jan. 22, 2019

(65) Prior Publication Data

US 2019/0154938 A1 May 23, 2019

Related U.S. Application Data

(63) Continuation of application No. 15/155,099, filed on May 16, 2016, now Pat. No. 10,197,757.
(60) Provisional application No. 62/162,506, filed on May 15, 2015.

(51) Int. Cl.
| | |
|---|---|
| *G02B 6/48* | (2006.01) |
| *B65H 75/12* | (2006.01) |
| *G02B 6/44* | (2006.01) |

(52) U.S. Cl.
CPC ........... *G02B 6/4457* (2013.01); *B65H 75/12* (2013.01); *B65H 2701/32* (2013.01); *G02B 6/483* (2013.01)

(58) Field of Classification Search
CPC .. G02B 6/4457; G02B 6/483; B65H 2701/32; B65H 75/12
See application file for complete search history.

(56) References Cited

U.S. PATENT DOCUMENTS

| | | | |
|---|---|---|---|
| 4,697,874 A | 10/1987 | Nozick | |
| 4,722,585 A * | 2/1988 | Boyer | G02B 6/4451 385/135 |
| 5,335,874 A | 8/1994 | Shrum | |
| 5,724,469 A * | 3/1998 | Orlando | G02B 6/444 385/135 |
| 5,802,237 A * | 9/1998 | Pulido | G02B 6/444 385/135 |

(Continued)

FOREIGN PATENT DOCUMENTS

MX 43658 3/2015

OTHER PUBLICATIONS

Hubbell Incorporated Opti-Loop, 2014.

*Primary Examiner* — Thomas A Hollweg
*Assistant Examiner* — Mary A El-Shammaa
(74) *Attorney, Agent, or Firm* — Ohlandt, Greeley, Ruggiero & Perle, LLP.

(57) ABSTRACT

A cable storage wheel for communication cables is provided. The cable storage wheel has a channel that receives the communication cable and a plurality of cable tie features. The cable tie features are positioned for receipt of cable ties to secure the communication cable in the channel in a manner that minimizes or eliminates contact between the wire ties and the communication cable. In this manner, the cable storage wheel is configured and designed to encourage the user to wrap the wire ties around the storage wheel and, not the communication cable. The cable tie features are, in some embodiments, slots, notches, openings, channel supports, and any combinations thereof.

10 Claims, 8 Drawing Sheets

(56) References Cited

U.S. PATENT DOCUMENTS

| | | | |
|---|---|---|---|
| 6,215,938 B1 * | 4/2001 | Reitmeier | G02B 6/4441 |
| | | | 385/134 |
| 6,243,526 B1 * | 6/2001 | Garibay | G02B 6/3887 |
| | | | 385/135 |
| 6,322,019 B1 | 11/2001 | Talamini | |
| 6,347,760 B1 | 2/2002 | Talamini | |
| 6,625,374 B2 | 9/2003 | Holman | |
| 6,643,444 B1 * | 11/2003 | Putnam | G02B 6/4457 |
| | | | 385/134 |
| 6,814,328 B1 * | 11/2004 | Li | G02B 6/4457 |
| | | | 242/400.1 |
| 7,302,155 B2 | 11/2007 | Weinert | |
| 7,359,609 B2 * | 4/2008 | Mahoney | G02B 6/4446 |
| | | | 385/134 |
| 7,997,520 B2 * | 8/2011 | Criscione | B65H 75/14 |
| | | | 191/12.2 R |
| 8,444,078 B1 | 5/2013 | Brown | |
| 2002/0172489 A1 | 11/2002 | Dauod | |
| 2004/0232275 A1 | 11/2004 | Vogel | |
| 2005/0145522 A1 * | 7/2005 | Bloodworth | G02B 6/4457 |
| | | | 206/409 |
| 2006/0068633 A1 * | 3/2006 | Murano | H02G 3/123 |
| | | | 439/535 |
| 2007/0274659 A1 | 11/2007 | Kaplan | |
| 2008/0296426 A1 | 12/2008 | Cairns | |
| 2009/0230228 A1 | 9/2009 | Penumatcha | |
| 2009/0317047 A1 | 12/2009 | Smith | |
| 2012/0145821 A1 | 6/2012 | Penumatcha | |
| 2012/0294580 A1 | 11/2012 | Burek | |
| 2013/0075522 A1 | 3/2013 | Penumatcha | |
| 2013/0315549 A1 * | 11/2013 | Rudenick | G02B 6/4454 |
| | | | 385/135 |
| 2018/0059352 A1 * | 3/2018 | Wells | G02B 6/4455 |
| 2019/0154937 A1 * | 5/2019 | Chu | G02B 6/4457 |

* cited by examiner

CABLE STORAGE WHEELS

CROSS REFERENCE TO RELATED APPLICATIONS

This application is a continuation of Ser. No. 15/155,099 filed May 16, 2016, which claims the benefit of U.S. Provisional Application 62/162,506 filed on May 15, 2015, the entire disclosure of each of which is incorporated by reference herein.

BACKGROUND

1. Field of the Disclosure

The present disclosure relates to cable storage devices and, more particularly, to cable storage wheels configured for use in the storage and/or installation and/or use of fiber optic or other cables.

2. Description of Related Art

Telecommunication infrastructure includes systems for mounting communication cables to utility poles or structures—so called aerial deployments. Thus, cable mounting devices are known that are specifically designed for aerially mounting such cable.

In some instances, the communication cables are fiber optic cables. One type of cable used in aerial fiber optic cable deployments is known as All Dielectric Self-Supporting (ADSS) cable. ADSS cables are fiber optic cables that are configured to support themselves between support towers or other structures without using conductive metal elements.

Another type of cable used in aerial fiber optic cable deployments is known as Loose Tube (LT) cables, which can be aerially deployed when lashed to a messenger wire.

These fiber optic cables are known to have minimum bending radius limitations. Unfortunately, violations of such minimum bending radius limitations during storage, installation, and/or use can damage the cables.

It has been determined by the present disclosure that in some aerial installations, as well as other installation types, there is a need for storage of excessive fiber optic cable in a manner that ensures the minimum radius of the cable is not exceeded and protects the cables from the environmental elements. Thus, it has been determined by the present disclosure that there is a need for cable storage devices that improve upon and/or offer other functionality than those currently available.

SUMMARY

Advantageously, the cable storage wheel shown and described herein is configured and designed to protect the bend radius of cables during storage while allowing the cables to rest in a protective channel.

Further, the cable storage wheel shown and described herein is configured and designed to allow the use of wire ties to maintain the cable in the channel while minimizing or eliminating contact between the wire tie and the cable. Stated another way, the cable storage wheel shown and described herein is configured and designed to encourage the user to wrap the wire ties around the storage unit, not the cable. The encouragement is provided through features strategically placed in and on the storage wheel. The features can include, but are not limited to slots, notches, openings, channel supports, and any combinations thereof.

In some embodiments, a cable storage wheel for communication cables is provided. The cable storage wheel has a channel that receives the communication cable and a plurality of cable tie features. The cable tie features are positioned for receipt of cable ties to secure the communication cable in the channel in a manner that minimizes or eliminates contact between the wire ties and the communication cable. The cable tie features can include slots, notches, openings, channel supports, and any combinations thereof.

A cable storage wheel for communication cable is provided. The storage wheel includes an inner hub, one or more upstanding rims, a protection channel, and a plurality of wire tire receiving features. The protection channel is defined between the inner hub and the one or more upstanding rims. The wire tire receiving features are defined on at least the inner hub and are configured to receive a wire tie to secure the communication cable in the protection channel without crimping or compressing the communication cable.

In some embodiments alone or in combination with one or more of the aft mentioned embodiments, the wire tire receiving features are slots that correspond in number to the one or more upstanding rims. The slots are defined through the inner hub at each radial position of the one or more upstanding rims.

In some embodiments alone or in combination with one or more of the afore and/or aft mentioned embodiments, the protection channel, in a region of the slot, is a rectangular shaped storage area bounded by the upstanding rim, a floor of the protection channel, the inner hub, and a wire tie secured in the slot.

In some embodiments alone or in combination with one or more of the afore and/or aft mentioned embodiments, the plurality of wire tire receiving features include a pair of corresponding notches, the pair of corresponding notches being defined at a radial position between the one or more upstanding rims.

In some embodiments alone or in combination with one or more of the afore and/or aft mentioned embodiments, the pair of corresponding notches correspond in number to the one or more upstanding rims.

In some embodiments alone or in combination with one or more of the afore and/or aft mentioned embodiments, one notch of the pair of corresponding notches is defined at an outer edge of the protection channel and another notch of the pair of corresponding notches is defined at an outer edge of the inner hub.

In some embodiments alone or in combination with one or more of the afore and/or aft mentioned embodiments, the protection channel, in a region of the pair of corresponding notches, is a triangular shaped storage area bounded by the inner hub, a floor of the protection channel, and a wire tie secured in the pair of corresponding notches.

In some embodiments alone or in combination with one or more of the afore and/or aft mentioned embodiments, the one or more upstanding rims are four, equally spaced apart rims having a common radial length.

In some embodiments alone or in combination with one or more of the afore and/or aft mentioned embodiments, the four rims span a total of less than 75% of a perimeter of the protection channel.

In some embodiments alone or in combination with one or more of the afore and/or aft mentioned embodiments, the four rims span a total of between 5% and 35% of a perimeter of the protection channel.

In some embodiments alone or in combination with one or more of the afore and/or aft mentioned embodiments, the protection channel and the inner hub are circular.

In some embodiments alone or in combination with one or more of the afore and/or aft mentioned embodiments, the protection channel and the inner hub have geometric configurations that allow the communication cable to be stored in the protection channel without violating a minimum bending radius limitation of the communication cable.

In some embodiments alone or in combination with one or more of the afore and/or aft mentioned embodiments, the protection channel has a channel floor having a plurality of drains defined therein.

In some embodiments alone or in combination with one or more of the afore and/or aft mentioned embodiments, the plurality of drains are sized and/or positioned to prevent wire ties from being placed therein.

In some embodiments alone or in combination with one or more of the afore and/or aft mentioned embodiments, the plurality of drains include text and/or indicia.

In some embodiments alone or in combination with one or more of the afore and/or aft mentioned embodiments, the inner hub includes one or more mounting openings.

The above-described and other features and advantages of the present disclosure will be appreciated and understood by those skilled in the art from the following detailed description, drawings, and appended claims.

DETAILED DESCRIPTION

Figure 1:
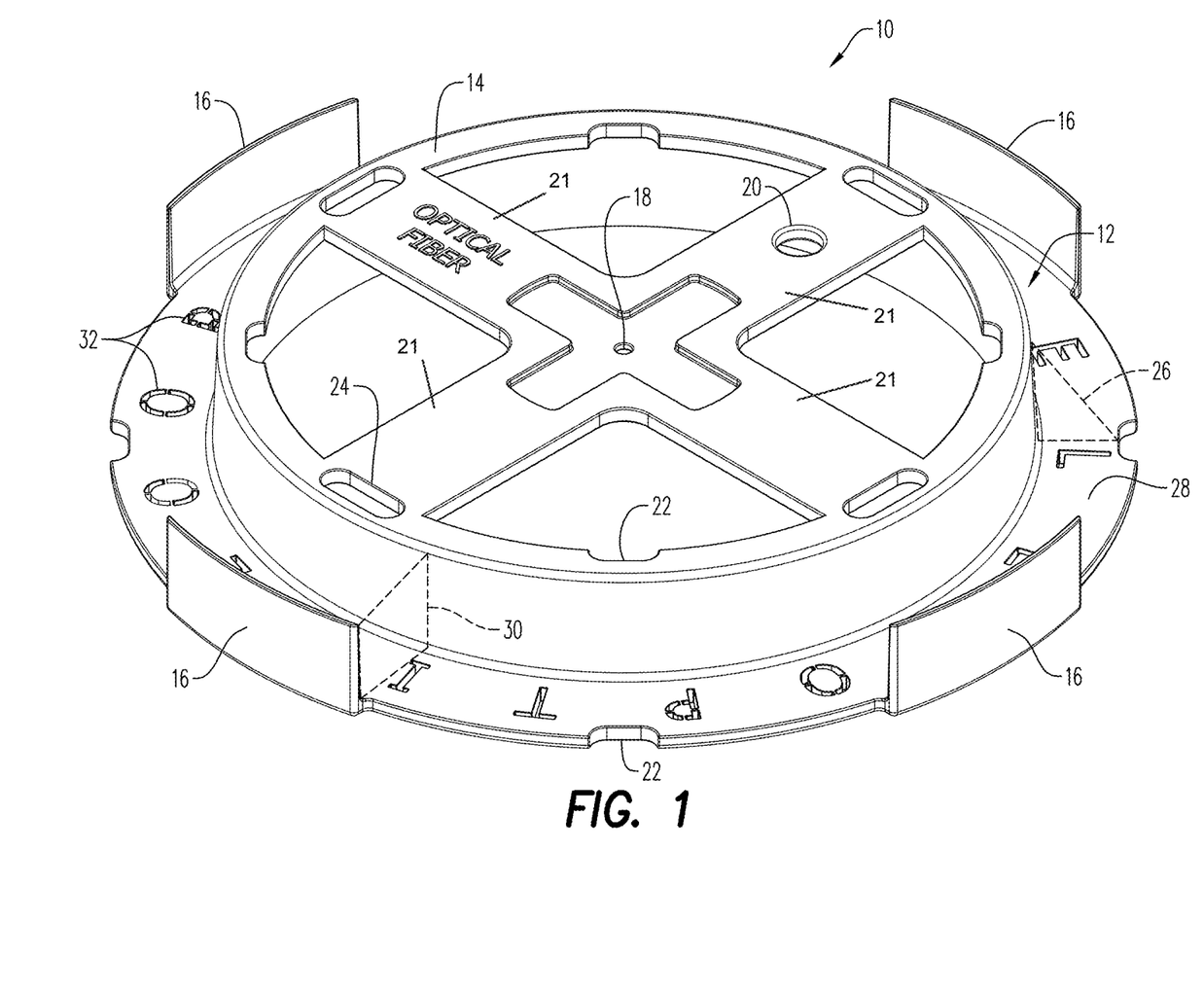
FIG. 1 is a top perspective view of a cable storage wheel according to an exemplary embodiment of the present disclosure.
Figure 2:
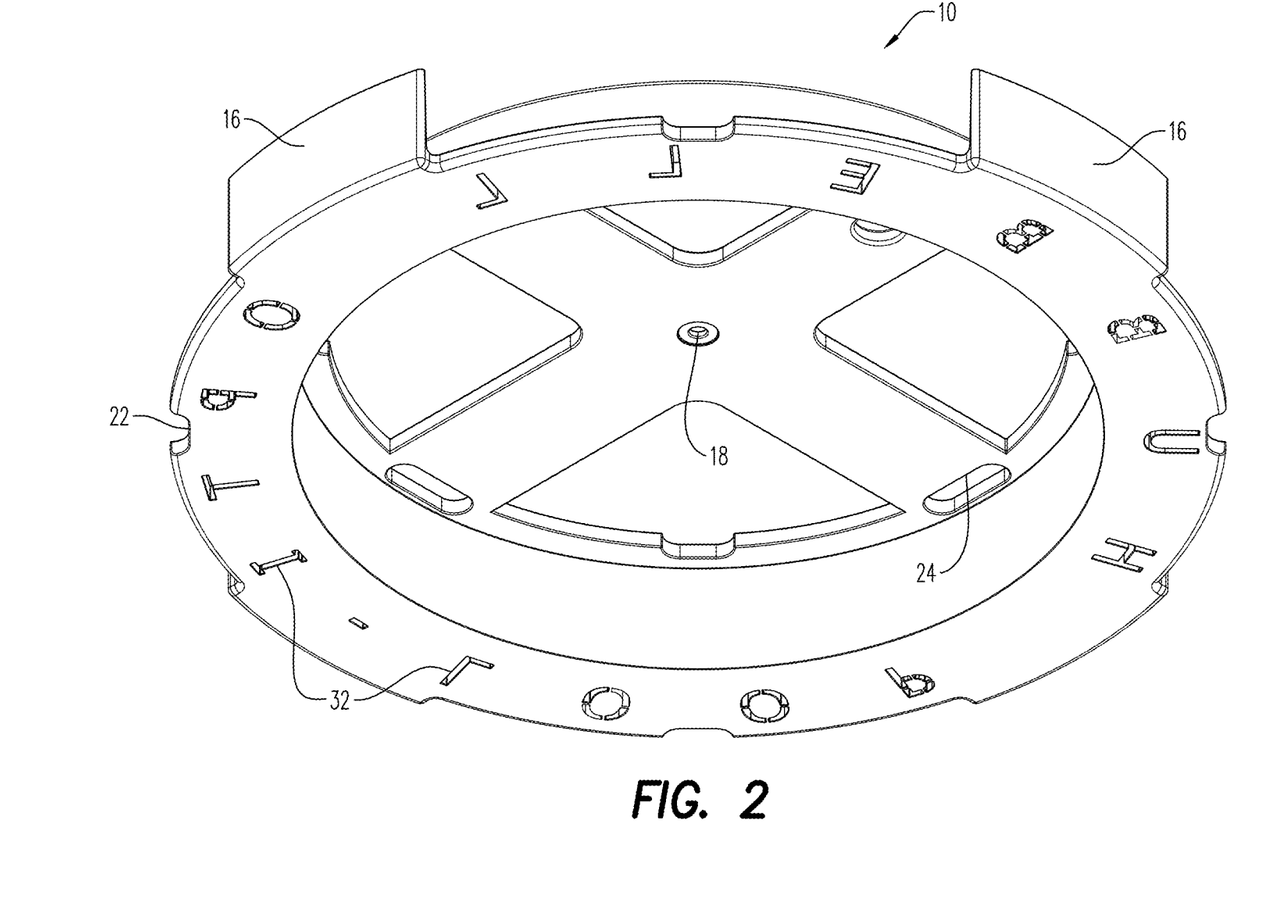
FIG. 2 is a bottom perspective view of the cable storage wheel of FIG. 1.
Figure 3:
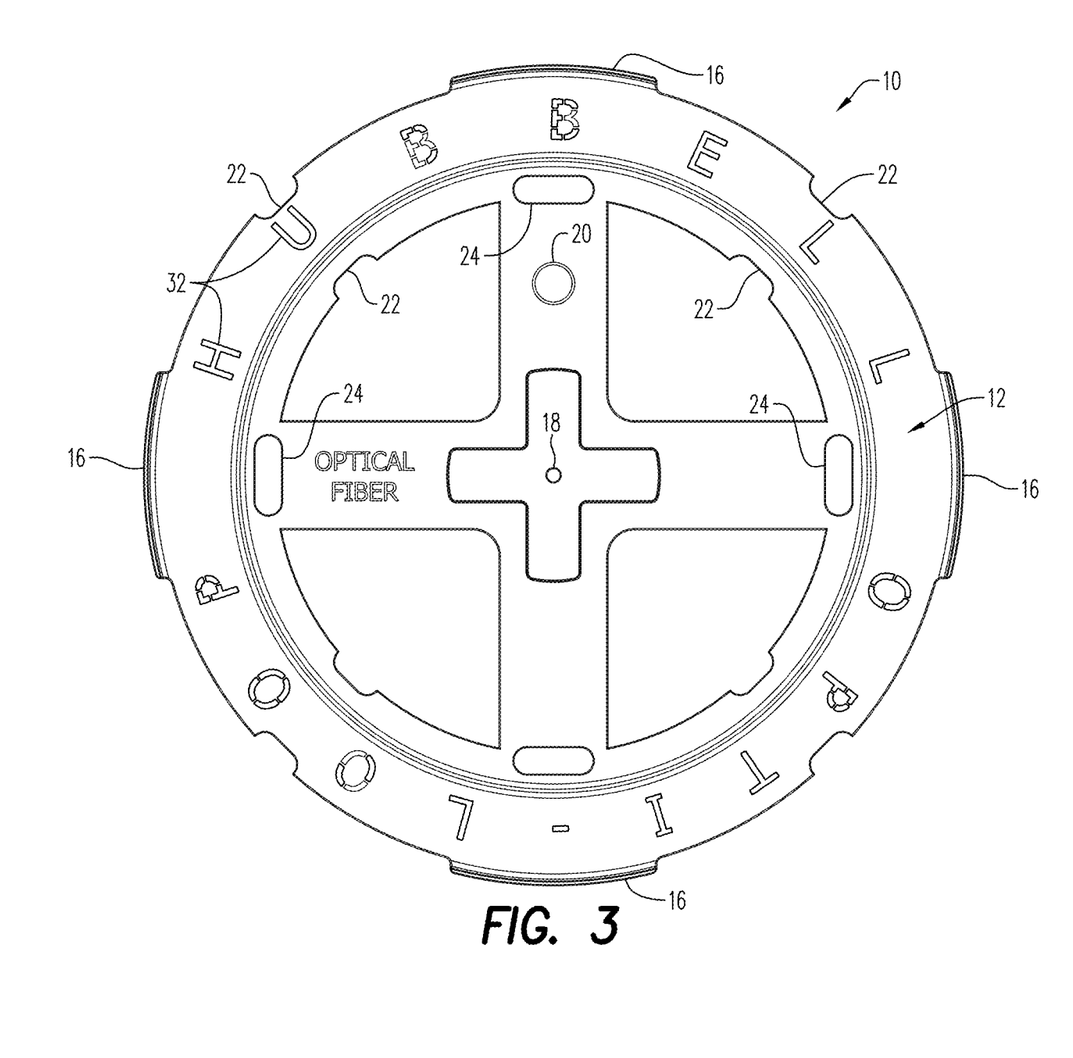
FIG. 3 is a top view of the cable storage wheel of FIG. 1.
Figure 4:
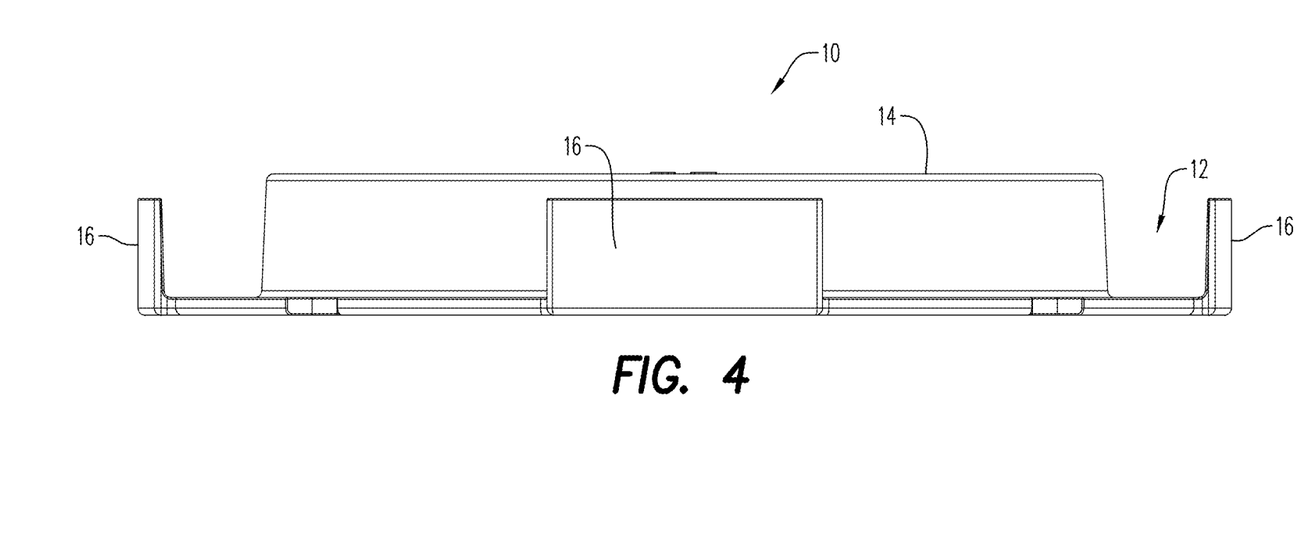
FIG. 4 is a side view of the cable storage wheel of FIG. 1.

As shown in FIGS. 1-4, an exemplary embodiment of a cable storage wheel is provided and is generally referred to by reference numeral 10. Cable storage wheel 10 is specifically designed for aerially storing and protecting reserve lengths and splice points for communication cables such as, but not limited to, ADSS cables, LT cables, and others.

Advantageously, cable storage wheel 10 shown and described herein is configured and designed to protect the bend radius of communication cables during storage while allowing the cables to rest in a protective channel 12. Specifically, cable storage wheel 10 is configured and designed to allow the use of wire ties to maintain the communications cable in channel 12 while minimizing or eliminating contact between the wire tie and the communication cable.

Stated another way, cable storage wheel 10 is configured and designed to encourage the user to wrap the wire ties around the storage wheel, not the communication cable. The encouragement is provided through features strategically placed in and on storage wheel 10. The features can include, but are not limited to slots, notches, openings, channel supports, and any combinations thereof.

Wheel 10 defines channel 12 between an inner hub 14 and one or more outer upstanding rims 16. Channel 12 is configured to receive and store one or more coils of a communication cable (not shown) at a radius above its minimum bending radius. It should be recognized that wheel 10 is illustrated having four, equally spaced apart rims 16 that have a common radial length by way of example only. Of course, it is contemplated by the present disclosure for wheel 10 to have any desired number of rims 16, any desired equal or un-equal rim spacing, and any common or different radial length that is sufficient to form channel 12. Moreover, it is contemplated by the present disclosure for wheel 10 to have a single continuous rim 16.

It has been determined by the present disclosure that, in some embodiments, it is advantageous for rims 16 to span a total of less than 75% of a perimeter of channel 12, preferably less than 50%, with between 5% and 35% being most preferred, and any subranges there between. In this way, rims 16 provide sufficient spacing to allow water to drain from channel 12 and/or allow for expansion of ice or snow in the channel to prevent compression of the cable stored within the channel.

In the illustrated embodiment, wheel 10, channel 12, and inner hub 14 are illustrated as circular. However, it is contemplated by the present disclosure for channel 12 and/or inner hub 14 and/or rim 16 to have any desired geometric configuration that allows cable to be stored in the channel without violating the minimum bending radius limitations of the cable stored therein.

Wheel 10 can include a central opening 18 configured to receive a mounting bracket (not shown). Additionally, wheel 10 can include one or more mounting openings 20 (one shown). Accordingly, openings 18, 20 when present can be used to secure wheel 10 to a supporting structure such as a utility pole or tower (not shown). In the illustrated embodiment, openings 18, 20 are shown in one or more cross members 21.

It has been determined by the present disclosure that there is a need for wheel 10 to allow the user to secure the cable in channel 12 without crimping or compressing the cable. Thus, wheel 10 includes a plurality of wire tie receiving features defined on hub that are configured to receive a wire tie that secures the communication cable in protection channel 12 without crimping or compressing the communication cable.

In some embodiments, the wire tire receiving features can be pairs of corresponding notches 22—one notch defined at an outer edge of channel 12 and another notch defined at an inner edge of hub 16. Notches 22 promote or encourage the user to wrap wire ties around wheel 10 at the location of the notches to secure the cable within channel 12. Preferably, wheel 10 is configured—by positioning and sizing of channel 12, hub 14, and notches 22 so that the wire tie does not touch or crimp the cable stored within channel 12.

In addition to or instead of notches 22, wire tie receiving features can be slots 24 that oppose upstanding rims 16. Slots 24 also promote or encourage the user to wrap wire ties around wheel 10 at the radial location of the slots 24 and rims 16 to secure the cable within channel 12. Preferably, wheel 10 is configured—by positioning and sizing of channel 12, hub 14, rims 16, and slots 24 so that the wire tie does not touch or crimp the cable stored within channel 12.

Advantageously, wheel 10 having both notches 22 and slots 24 provide flexibility for the amount of cable secured in channel 12. For example, the use of cable ties with notches 22 provide a triangular shaped storage area 26—namely one bounded by floor 28 of channel 12, hub 14, and the wire tie. Conversely, the use of cable ties with slots 24 provide a rectangular shaped storage area 30—namely one bounded by rim 16, the floor of channel 12, hub 14, and the wire tie.

Slots 24 be used to band or secure wheel 10 to the supporting structure such as a utility pole or tower (not shown). Thus, slots 24 can be used to both secure wheel 10 to the supporting structure and to secure the communications cables in channel 12.

Wheel 10 can be formed of any material having sufficient rigidity and strength to support the cable in the desired deployment. By way of example, wheel 10 can be formed of metal or polymer materials. Wheel 10 can be formed as a unitary, one-piece member or can be formed of multiple components that are secured to one another in any desired manner.

Wheel 10 can include a plurality of drains 32 that allow water to drain from channel 12 and/or allow for expansion of ice or snow in the channel to prevent compression of the cable stored within the channel. In some embodiments, drains 32 are sized and/or positioned to dissuade the user from placing wire ties through the drains in a manner that causes the wire ties to crimp or compress the cable in channel 12. For example, drains 32 can, in some embodiments, be configured as text or other indicia—which dissuades the user from placing wire ties in the drains. Drains 32 are shown by way of example only in floor 28. Of course, it is contemplated by the present disclosure for any portion of wheel 10 to include drains 32. For example, drains 32 can be formed in one or more of floor 28, hub 14, rims 16, and any combinations thereof.

Figure 5:
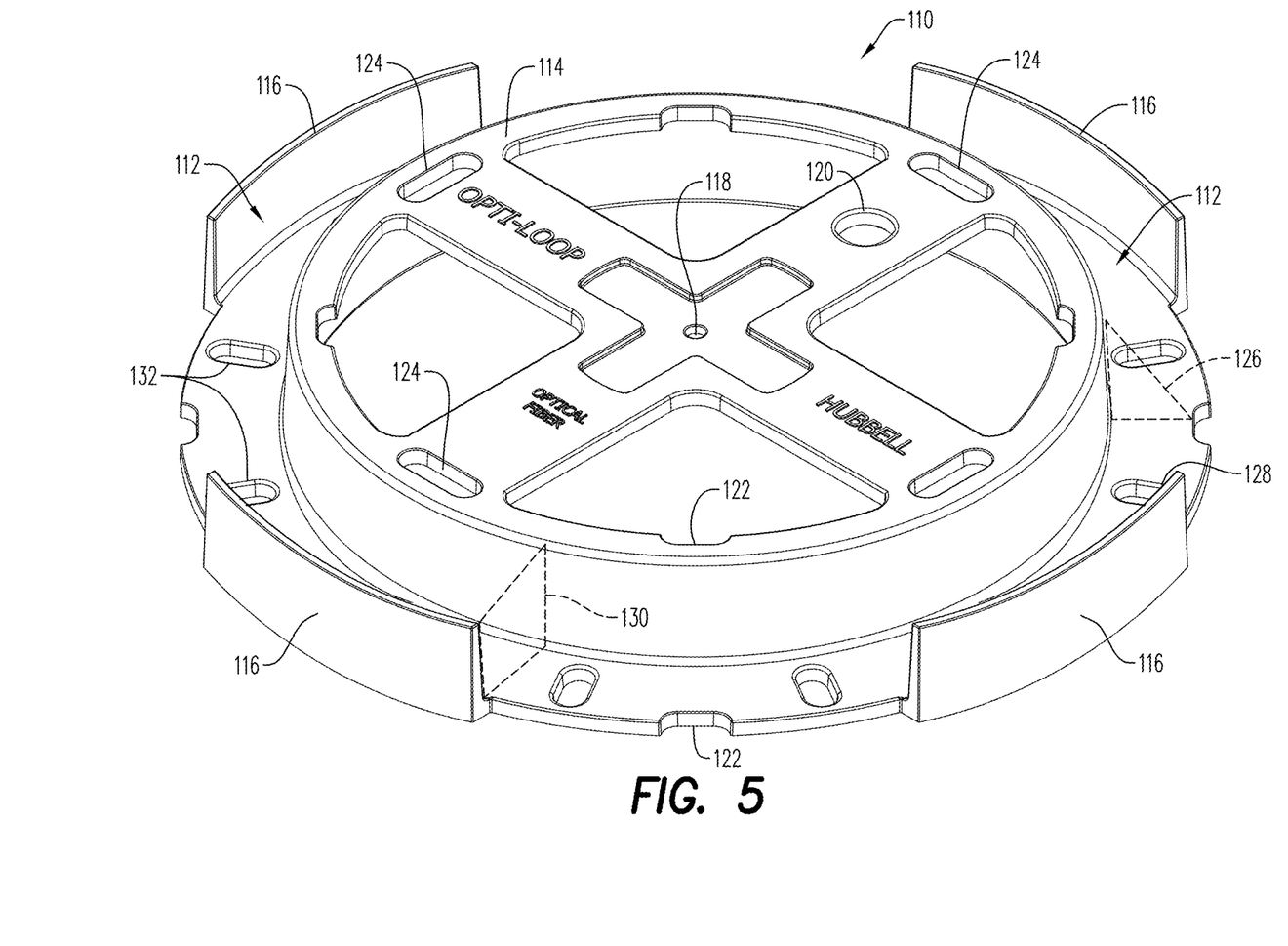
FIG. 5 is a top perspective view of another exemplary embodiment of a cable storage wheel according to the present disclosure.
Figure 6:
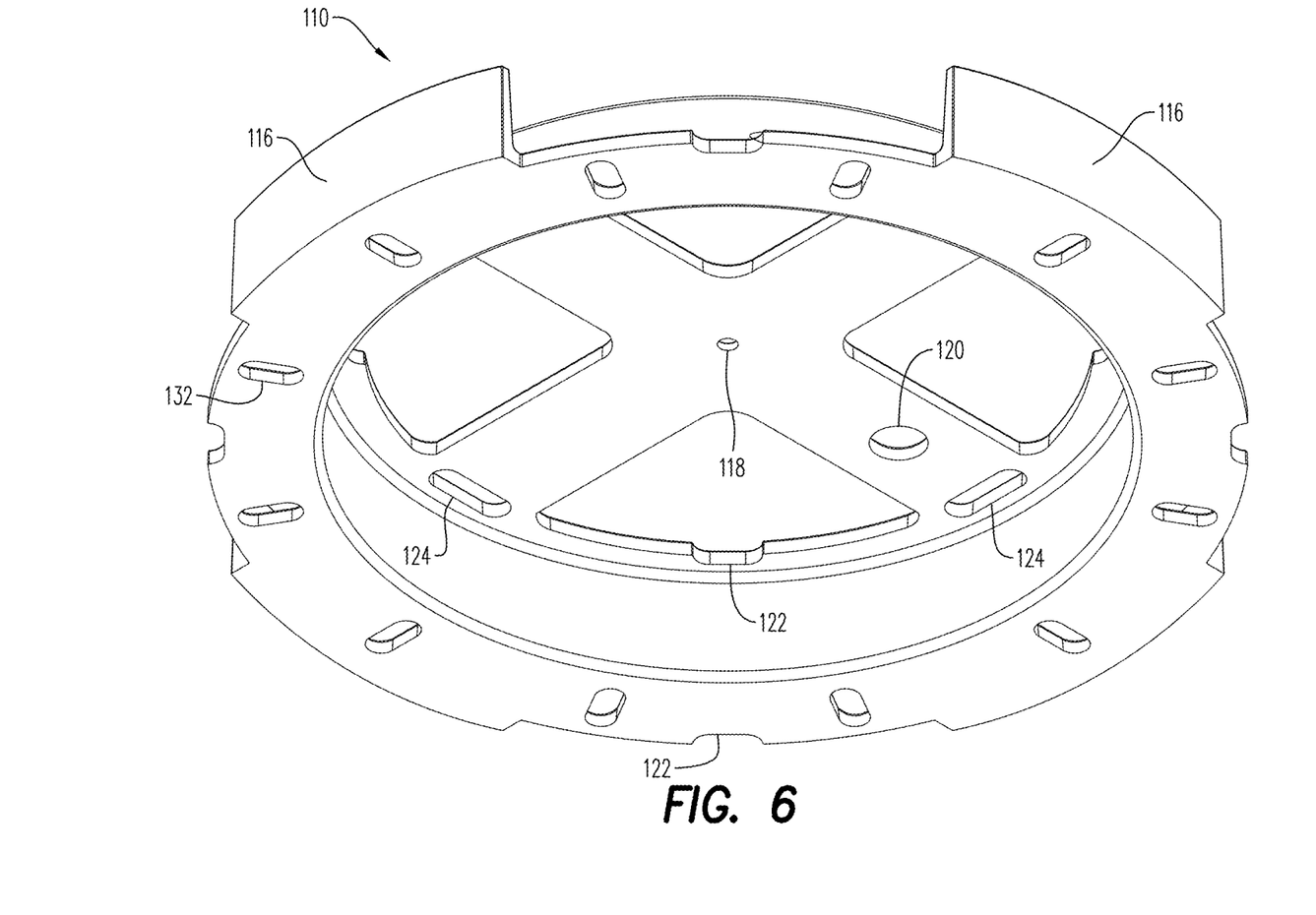
FIG. 6 is a bottom perspective view of the cable storage wheel of FIG. 5.
Figure 7:
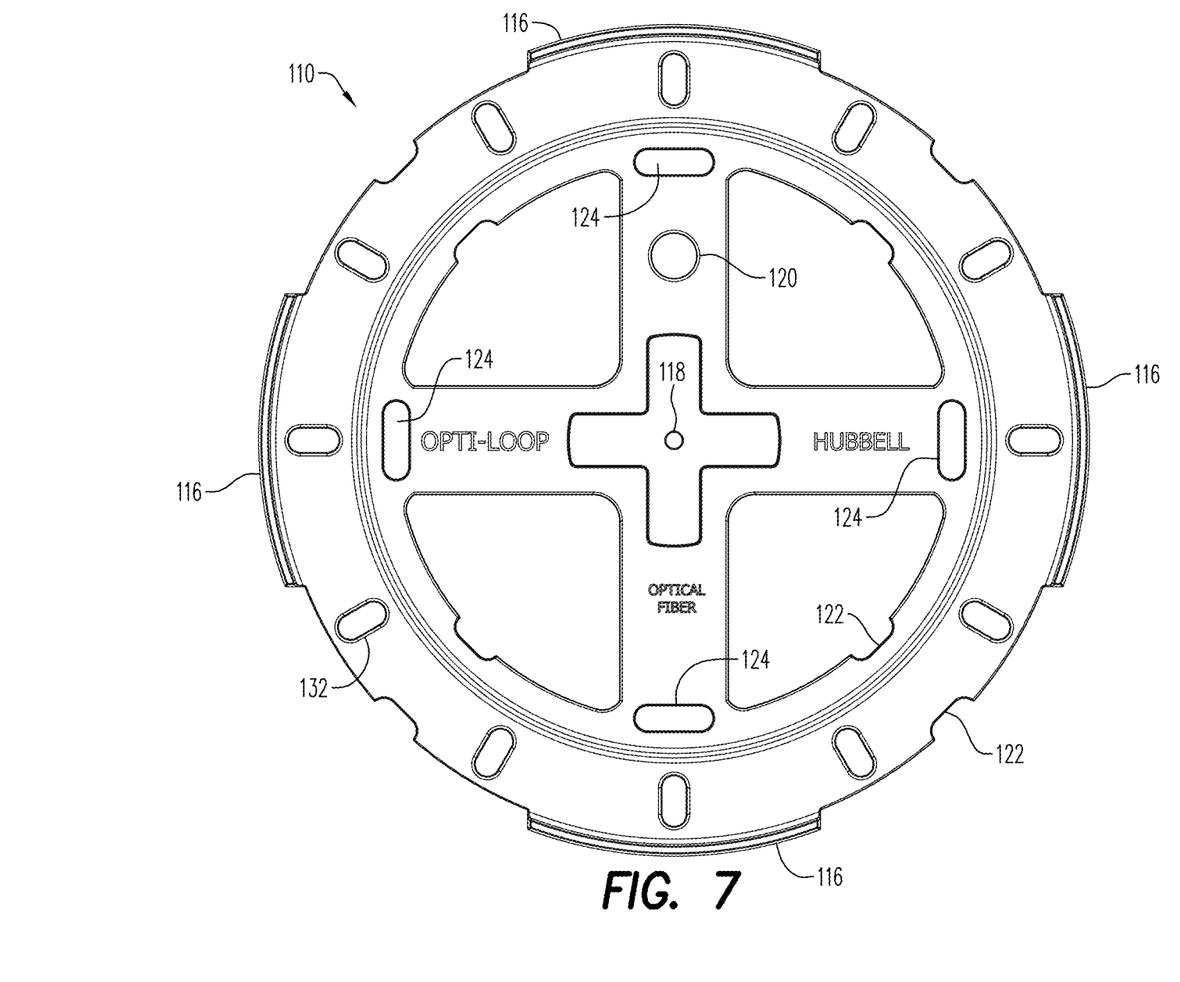
FIG. 7 is a top view of the cable storage wheel of FIG. 5.
Figure 8:
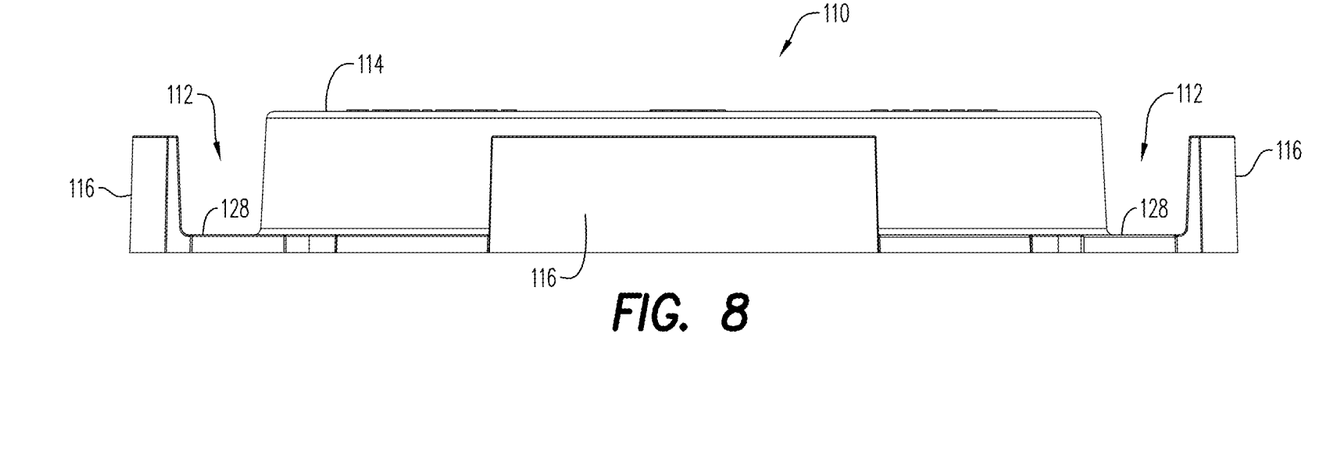
FIG. 8 is a side view of the cable storage wheel of FIG. 5.

Referring now to FIGS. 5-8, an alternate exemplary embodiment of a cable storage wheel according to the present disclosure is shown. Here, component parts performing similar or analogous functions to those in the embodiment of FIGS. 1-4 are labeled in multiples of one hundred.

Cable storage wheel 110 includes a protective channel 112 defined between an inner hub 114 and one or more outer upstanding rims 116. Channel 112 is configured to receive and store one or more coils of a communication cable (not shown) at a radius above its minimum bending radius.

Wheel 110 is illustrated having four, spaced apart rims 116 by way of example only. Of course, it is contemplated by the present disclosure for wheel 110 to have any desired number of rims 116 that are sufficient to form channel 112. Of course, it is contemplated by the present disclosure for wheel 110 to have any desired number of rims 116, any desired equal or un-equal rim spacing, and any common or different radial length that is sufficient to form channel 112. Moreover, it is contemplated by the present disclosure for wheel 110 to have a single continuous rim 116.

It has been determined by the present disclosure that, in some embodiments, it is advantageous for rims 16 to span a total of less than 75% of a perimeter of channel 112, preferably less than 50%, with between 5% and 35% being most preferred, and any subranges there between. In this way, rims 116 provide sufficient spacing to allow water to drain from channel 112 and/or allow for expansion of ice or snow in the channel to prevent compression of the cable stored within the channel.

Moreover, it is contemplated by the present disclosure for channel 112 and/or inner hub 114 and/or rim 116 to have any circular or non-circular geometric configuration that allows cable to be stored in the channel without violating the minimum bending radius limitations of the cable stored therein.

Wheel 110 can include a central opening 118 configured to receive a mounting bracket (not shown) and/or one or more mounting openings 120 (one shown).

Advantageously, wheel 110 includes corresponding notches 122 at an outer edge of channel 112 and an inner edge of hub 116. Notches 122 promote or encourage the user to wrap wire ties around wheel 110 at the location of the notches to secure the cable within channel 112. Preferably, wheel 110 is configured—by positioning and sizing of channel 112, hub 114, and notches 122 so that the wire tie does not touch or crimp the cable stored within the channel. Here, the use of cable ties with notches 122 provide a triangular shaped storage area 126—namely one bounded by floor 128 of channel 112, hub 114, and the wire tie.

In addition to or instead of notches 122, wheel 110 can advantageously include corresponding slots 124 that oppose upstanding rims 116. Slots 124 also promote or encourage the user to wrap wire ties around wheel 110 at the location of the slots 124 and rims 116 to secure the cable within channel 112. Preferably, wheel 110 is configured—by positioning and sizing of channel 112, hub 114, rims 116, and slots 124 so that the wire tie does not touch or crimp the cable stored within channel 112. Here, the use of cable ties with slots 124 provide a rectangular shaped storage area 130—namely one bounded by rim 116, the floor of channel 112, hub 114, and the wire tie.

Slots 124 be used to band or secure wheel 110 to the supporting structure such as a utility pole or tower (not shown). Thus, slots 124 can be used to both secure wheel 110 to the supporting structure and to secure the communications cables in channel 112.

Wheel 110 can include a plurality of drains 132 that allow water to drain from channel 112 and/or allow for expansion of ice or snow in the channel to prevent compression of the cable stored within the channel. It is contemplated by the present disclosure for any portion of wheel 110 to include drains 132 including, but not limited to, floor 128, hub 114, rims 116, and any combinations thereof.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST

| | |
|---|---|
| cable storage wheel 10 | cable storage wheel 110 |
| protective channel 12 | protective channel 112 |

-continued

| | |
|---|---|
| inner hub 14 | inner hub 114 |
| upstanding rims 16 | upstanding rims 116 |
| central opening 18 | central opening 118 |
| mounting openings 20 | mounting openings 120 |
| notches 22 | notches 122 |
| slots 24 | slots 124 |
| triangular shaped storage area 26 | triangular shaped storage area 126 |
| channel floor 28 | floor 128 |
| rectangular shaped storage area 30 | rectangular shaped storage area 130 |
| drains 32 | drains 132 |

What is claimed is:

1. A cable storage wheel for communication cable, comprising:
 an inner hub having an outer surface and a cross member having an opening configured to secure the inner hub to a supporting structure;
 a channel floor extending outward from the inner hub and having an outer dimension;
 a plurality upstanding rims each having an inner surface, the plurality upstanding rims extending from the channel floor at the outer dimension; and
 a protection channel bounded by the outer surface of the inner hub, the channel floor, and, where present, the inner surface of the plurality of upstanding rims,
 wherein no portion of the inner hub or the plurality upstanding rims cover the protection channel, and
 wherein the protection channel has a geometric configuration such that the communication cable is storable entirely within the protection channel without violating a minimum bending radius limitation of the communication cable.

2. The cable storage wheel of claim 1, further comprising a plurality of wire tire receiving features configured to receive a wire tie to secure the communication cable in the protection channel.

3. The cable storage wheel of claim 2, wherein the plurality of wire tire receiving features are defined on the inner hub.

4. The cable storage wheel of claim 3, wherein the plurality of wire tire receiving features correspond in number to the plurality of upstanding rims, and wherein the plurality of wire tire receiving features comprise a slot defined through the inner hub at each radial position of the plurality of upstanding rims.

5. The cable storage wheel of claim 4, wherein the protection channel, in a region of the slot, is a rectangular shaped storage area bounded by the inner surface of the upstanding rim, the channel floor, the outer surface of the inner hub, and a wire tie secured in the slot.

6. The cable storage wheel of claim 2, wherein the plurality of wire tire receiving features comprise a pair of corresponding notches, the pair of corresponding notches being defined at a radial position between the plurality of upstanding rims.

7. The cable storage wheel of claim 6, wherein the pair of corresponding notches correspond in number to the plurality of upstanding rims.

8. The cable storage wheel of claim 1, wherein the plurality of upstanding rims span a total of between 5% and 35% of the outer dimension.

9. The cable storage wheel of claim 1, wherein the protection channel is circular.

10. The cable storage wheel of claim 1, wherein the cable storage wheel is a unitary, one-piece member formed of polymer materials.

* * * * *